United States Patent Office 3,730,775
Patented May 1, 1973

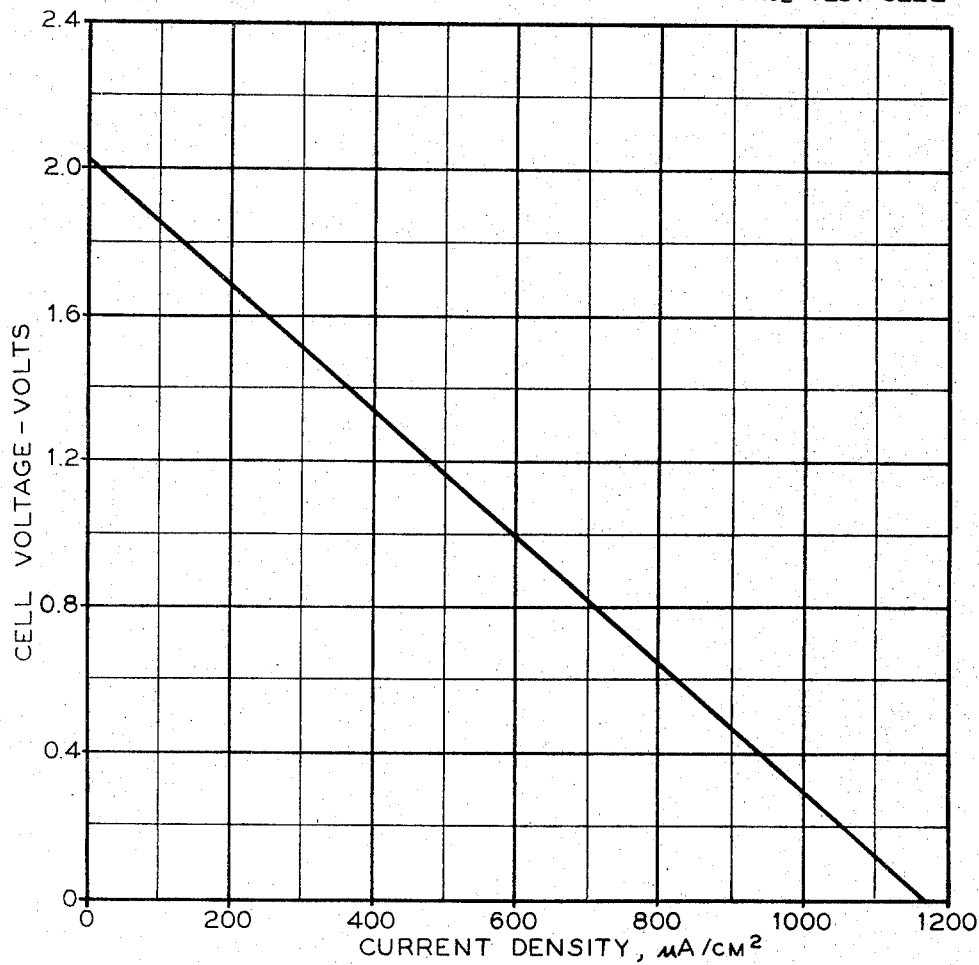

3,730,775
TIN HALIDE CATHODE FOR SOLID ELECTROLYTE BATTTERY SYSTEMS
Charles C. Liang, Andover, Mass., assignor to P. R. Mallory & Co., Inc., Indianapolis, Ind.
Continuation-in-part of application Ser. No. 81,083, Oct. 15, 1970. This application July 9, 1971, Ser. No. 161,163
Int. Cl. H01m 11/00, 15/06
U.S. Cl. 136—83 R
4 Claims

ABSTRACT OF THE DISCLOSURE

A further improvement in the performance of a solid electrolyte cell containing lithium anode and lithium iodide-lithium hydroxide aluminum oxide electrolyte by the utilization of a cathode material containing a thin halide, such as $SnI_2$.

This is a continuation-in-part of application U.S. Ser. No. 81,083 filed Oct. 15, 1970, said application is directed to a solid electrolyte cell exhibiting high output voltage, high energy density, and longer shelf life.

This invention relates to a new cathode material for use in high voltage solid electrolyte battery systems.

Miniaturization in electronics has been rapidly advancing in recent years and has resulted in increased demand for special power sources characterized by volume and weight comparable to those of electronic components employed in the circuitry. Success in meeting this demand has been achieved by employing solid electrolyte cells. Apart from the advantage of miniaturization, solid electrolyte cells and batteries permit great flexibility in design.

The electrolytes employed in solid state cells are ionic conductors which facilitate the ionic flow during the operation of the solid state cells. The performance of any given cell depends, among other factors, on the specific resistance of the electrolyte; the nature of the conducting species and their transport number, the temperature of the cell, and the products of the cell reactions.

It is an object of the present invention to provide a cathode active material for use with a solid electrolyte in a solid electrolyte cell comprising a tin halide.

It is another object of the present invention to provide a cathode active material comprising $SnI_2$, tin metal, and a solid electrolyte consisting of lithium iodide, lithium hydroxide, and aluminum oxide.

It is another object of the present invention to provide a solid electrolyte cell comprising an anode, a solid electrolyte, and a cathode active material comprising a tin halide.

It is a still further object of the present invention to provide a solid electrolyte cell comprising an anode; a solid electrolyte consisting of lithium iodide, lithium hydroxide, and aluminum oxide; and a cathode active material comprising $SnI_2$, tin metal, and the solid electrolyte.

Still another object of the present invention is to provide a primary cell including a tin halide cathode active material.

Other objects of the invention will become apparent from the following description.

Generally speaking, the present invention provides a new battery system which employs a novel cathode material comprised of $SnI_2$, tin metal and the solid electrolyte.

It has been discovered that in solid electrolyte cell systems the presence of a tin halide, such as tin iodide, in the cathode material serves to substantially increase the energy density and the voltage of these systems.

The solid electrolyte of this invention contains LiI, LiOH, and $Al_2O_3$. It is practically a pure ionic conductor with a conductivity ranged between $5 \times 10^{-6}$ ohm$^{-1}$ cm.$^{-1}$ and $1 \times 10^{-5}$ ohm$^{-1}$ and cm.$^{-1}$ at room temperature.

The electrolyte material of this invention may be prepared by the following procedure.

A sufficient amount of $CH_3O$ His added to a mixture of $LiI \cdot 3H_2O$, $LiOH \cdot H_2O$ and $Al_2O_3$ with the mole ratio of $LiI:LiOH:Al_2O_3 = 4:1:2$ to form a slurry. The slurry is dried on a hot plate and then 50 ml. of water is added. The mixture is heated on a hot plate for two to three hours to form a paste. The paste is then first dried in an oven at about 140° C. for about two hours, and then further dried at 300° C. in an argon atmosphere.

The conductivity of a $4LiI \cdot 1LiOH \cdot 2Al_2O_3$ electrolyte, thus formed, was determined by measuring the resistance of a pellet of that material compressed under a pressure of 50,000 lbs./in.$^2$. At $25 \pm 1°$ C., the conductivity was found to be about $1 \times 10^{-5}$ ohm$^{-1}$ cm.$^{-1}$. The density of the pellet formed under the pressure of 50,000 lbs./in.$^2$ was found to be 3.3 g./cc.

A test cell made according to the following system, $$Li/4LiI \cdot 1LiOH \cdot 2Al_2O_3/SnI_2$$
Anode    Electrolyte    Cathode and tested under a load, showed a voltage versus current density curve as shown in FIG. 1, with the current density in microamperes. The test cell used for this purpose had an electrode surface area 1.5 cm.$^2$ and a thickness of 0.05 cm. The electrolyte layer was made up of 30 mg. of the material with a thickness of 0.018 cm. In the cathode mixture, 100 mg. were used, in which the mixture included a 1:1:1 weight ratio of $SnI_2$, tin metal powder, and the solid electrolyte material of this system. The anode can be either pure lithium, or a mixture containing lithium; the electrolyte and an electronic conductor.

The open circuit voltage of the cell was found to be $2.05 \pm 0.05$ v. at room temperature, which is in good agreement with the theoretical value of the $Li/SnI_2$ system, which would indicate that the electronic conductivity of this electrolyte is negligible, and that the electrolyte is, for all practical purposes, a pure ionic conductor.

Due to the ionic conductivity of the electrolyte, the current capability of the $Li/4LiI \cdot 1LiOH \cdot 2Al_2O_3/SnI_2$ system is much higher than that of the $Li/LiI/SnI_2$ system. Under a current drain of 100 $\mu$a./cm.$^2$ the $$Li/4LiI \cdot 1LiOH \cdot 2Al_2O_3/SnI_2$$

test cell showed an IR loss, or drop in voltage, of less than 0.3 v. On the other hand, the IR loss of a $Li/LiI/SnI_2$ cell with a LiI electrolyte of similar thickness would have been greater than 2 v. under a current drain of less than 20 $\mu$a./cm.$^2$.

FIG. 1 shows a graph of the polarization curve of the cell voltage against current density, for a cell utilizing a solid electrolyte material between a lithium anode and the tin iodide cathode of this invention.

Several different electrolytes are here listed, in which the compositions were made up as shown in the four following examples, in which the electrolytes numbers are merely for applicant's identification of the particular composition.

(1) (Electrolyte No. LLA–412)—$4LiI \cdot LiOH \cdot 2Al_2O_3$ (LiI 57.14 mole percent; LiOH 14.29 mole percent; $Al_2O_3$ 28.57 mole percent).

(2) (Electrolyte No. LA–42)—$4LiI \cdot 2Al_2O_3$ (LiI 66.67 mole percent LiOH 0 mole percent; $Al_2O_3$ 33.33 mole percent).

(3) (Electrolyte No. LLA–411)—$4LiI \cdot LiOH \cdot Al_2O_3$ (LiI 66.67 mole percent; LiOH 16.66 mole percent; $Al_2O_3$ 16.66 mole percent).

(4) (Electrolyte No. LLA-221)—$2LiI \cdot 2LiOH \cdot Al_2O_3$ (LiI 40 mole percent; LiOH 40 mole percent; $Al_2O_3$ 20 mole percent).

The electrolytes were found to be practically pure ionic conductors. Their ionic conductivities at 25° C. were:

|  | $Ohm^{-1}\ cm.^{-1}$ |
|---|---|
| LLA-412 | $1 \times 10^{-5}$ |
| LA-42 | $1 \times 10^{-5}$ |
| LLA411 | $5 \times 10^{-6}$ |
| LLA221 | $5 \times 10^{-6}$ |

The electrolytes were prepared from reagent grade LiI and LiOH and Fisher absorption grade $Al_2O_3$.

An electrolyte found to be satisfactory was also made according to the following procedure:

A well blended powder mixture of anhydrous LiI, anhydrous LiOH and dry $Al_2O_3$ were heated to a temperature above the melting point of LiI (450° to 500° C.) under an inert atmosphere (e.g. Ar, He or $N_2$).

The conductivity of the new electrolyte is 50 to 100 times higher than that of LiI. The increase in conductivity may be caused.

(a) A chemical reaction between LiI and $Al_2O_3$ or LiI, LiOH and $Al_2O_3$ producing a more conductive complex; or (b) Absorption of LiI and LiOH by $Al_2O_3$ resulting in an increase in the "internal surface area" of LiI; or (c) An increase of the cation vacancies in the LiI lattice by the incorporation of the additives.

The percentages of the respective components of the mixture do not appear to be critical. The advantageous operation of this cathode material in improving the cell voltage characteristics and in increasing the energy density of the system is due to the thermodynamic properties of the active cathode material.

Thus, some variations may be made in the percentages of the ingredients composing either the electrolyte or the cathode without departing from the spirit and scope of the invention as set forth in the appended claims.

What is claimed is:

1. The solid electrolyte cell comprising an anode; a solid electrolyte; and a cathode active material comprising a mixture of tin halide, tin metal, and the solid electrolyte of the cell.

2. The solid electrolyte cell of claim 1 wherein said solid electrolyte consists of lithium iodide, lithium hydroxide, and aluminum oxide.

3. The solid electrolyte cell of claim 2 wherein the tin halide is $SnI_2$; and wherein the cathode material comprises $SnI_2$, tin metal, and the solid electrolyte.

4. The solid electrolyte cell of claim 3 wherein the anode is lithium; and wherein the solid electrolyte is $4LiI \cdot LiOH \cdot 2Al_2O_3$.

References Cited

UNITED STATES PATENTS

| 3,455,742 | 7/1969 | Rao | 136—83 R |
| 3,499,796 | 3/1970 | Hever et al. | 136—83 R |
| 3,513,027 | 5/1970 | Liang et al. | 136—83 R |
| 3,567,518 | 3/1971 | Smyth et al. | 136—153 |
| 3,582,404 | 6/1971 | Blackburne et al. | 136—83 |
| 3,591,418 | 7/1971 | Sutula | 136—83 T |

ANTHONY SKAPARS, Primary Examiner

U.S. Cl. X.R.

136—137, 153